Patented June 6, 1939

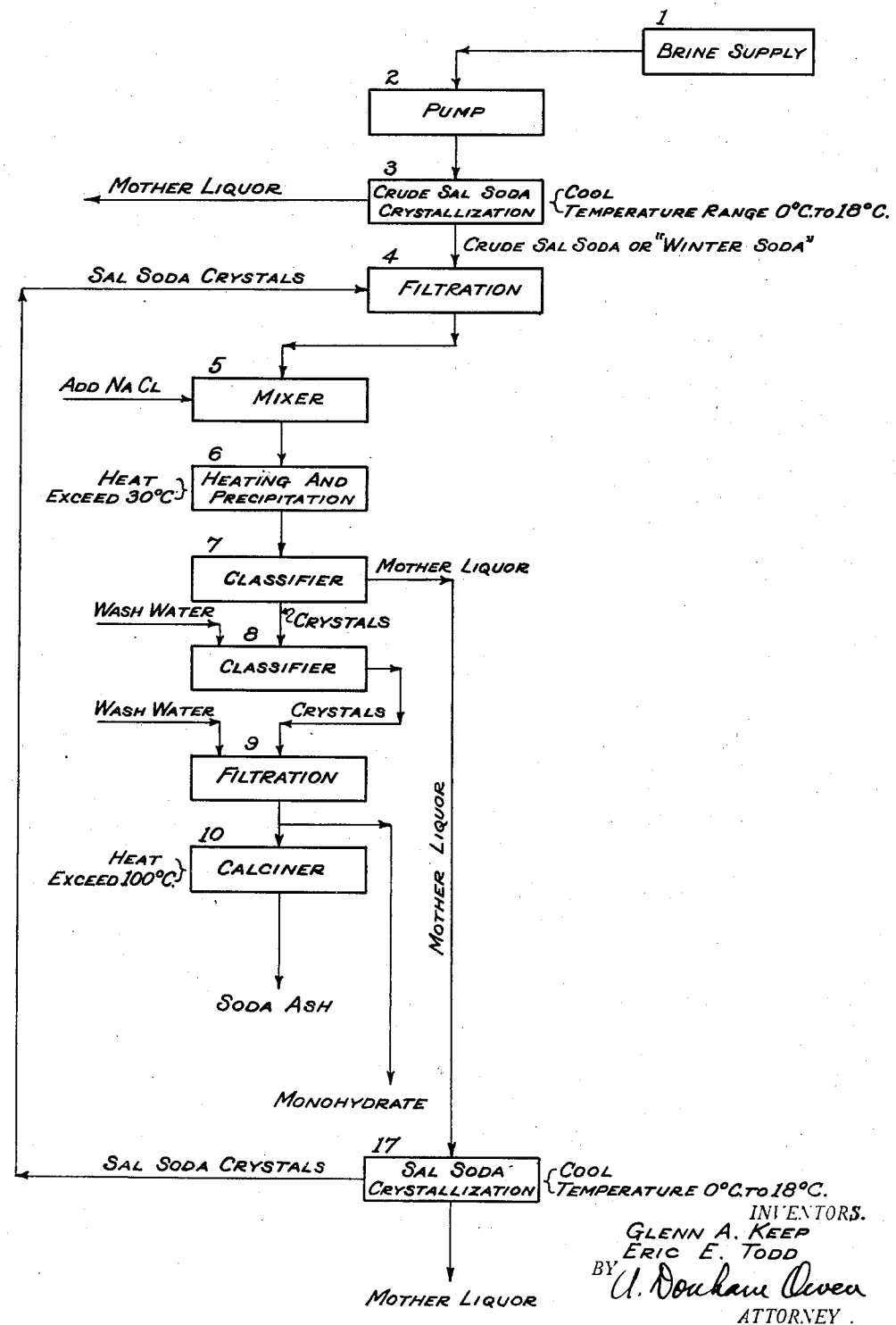

2,161,711

UNITED STATES PATENT OFFICE 2,161,711

PROCESS FOR MAKING SODIUM CARBONATE PRODUCTS

Glenn A. Keep and Eric Edward Todd, Keeler, Calif.

Application June 25, 1935, Serial No. 28,282

10 Claims. (Cl. 23—63)

This invention relates to the recovery of marketable sodium carbonate from a complex brine such as that which exists at Owens Lake, California. A complex brine is defined as a solution containing other chemical salts in addition to sodium carbonate. Such a complex brine as that at Owens Lake includes mainly sodium carbonate, sodium chloride, sodium sulfate and potassium chloride, as well as varying and usually small amounts of borates, phosphates and silicates.

To recover sodium carbonate in a relatively pure state and marketable form from such complex brines is a difficult matter. The problem has received the attention of many and the literature is replete with suggestions as to how the sodium carbonate content of such complex brines can be economically recovered. In the main, such suggested methods are concerned with complicated separations of chemical salts involving expensive machinery, costly crude materials, and high operating costs associated with carbonation and/or evaporation. Some processes demand successive separations of chemical salts from mother liquors thereby requiring the operation and maintenance of several settling and filtration steps. Many attempts to recover sodium carbonate from such complex brines have failed when placed in commercial operation because of high operating costs induced by costly crude materials, high power consumption, operation of troublesome and complicated mechanical apparatus and inability to commercially carry out the chemical reactions necessary for success.

The process of the present invention avoids those difficulties common to processes heretofore. For instance, carbonation is not practiced, thus avoiding the large investment required for lime kilns and carbon dioxide compressors as well as the accompanying operating costs for power, limestone and coke. As a further instance, evaporation is not practiced, thus avoiding the large investment in evaporators and steam plant as well as the accompanying operating costs involving steam generation and mechanical and chemical troubles often associated with evaporators such as incrustation of salts on evaporator tubes, connecting pipe lines and pumps.

Owens Lake, California, existed as a saline lake whose brine contained in solution such salts as sodium chloride, sodium carbonate, sodium bicarbonate, sodium sulfate and potassium chloride as well as small amounts of borates, phosphates and silicates. Owens Lake had no outlet and for a long period of time its level was maintained by water from the Owens River which emptied into the lake substantially balancing the water which evaporated.

When the Owens River flow of water was diverted into the Los Angeles aqueduct, the evaporation of water from the surface of the lake exceeded the supply of drainage water into Owens Lake. Hence there was a rapid concentration of the saline lake brine. This concentration continued to a point of saturation which caused precipitation and deposition of solid chemical salts. The compound to first deposit out of the lake brine was the double salt of sodium carbonate and sodium bicarbonate, $Na_2CO_3.NaHCO_3.2H_2O$, commonly referred to in the trade and literature as sesqui carbonate, urao, or trona. This deposit of trona, which removed a large part of the sodium bicarbonate from the lake brine, now exists as a solid layer on the lake bottom. Continued evaporation caused the deposition of other chemical salts consisting mainly of sodium carbonate, sodium bicarbonate, sodium chloride and sodium sulfate. Much of the sodium sulfate was deposited as a double compound of sodium carbonate and sodium sulfate known in the caustic soda industry as sulfate carbonate and recently described in the literature as burkeite.

As a result of natural evaporation and deposition of chemical salts, Owens Lake is now practically dry as far as its upper surface is concerned. There remains in the bed of the lake, a deposit of mixed chemical salts mainly composed of sodium carbonate, sodium bicarbonate, sodium chloride, and sodium sulfate impregnated with the resultant mother liquor currently known as lake brine.

Owing to the deposition of the double salts, trona and burkeite, and other salts, the present mother liquor or current lake brine differs greatly in composition from the original brine of Owens Lake. Not only is there a difference in composition but relative amounts or ratios of one chemical salt to another have been greatly altered. For instance, the formation of solid trona removed large amounts of sodium bicarbonate.

The formation of burkeite removed large amounts of sodium sulfate. This change to lower ratios of bicarbonate and sulfate to the carbonate content of lake brine is important, because in our invention, advantage is taken of this natural purification and concentration of lake brine.

The following brine analyses illustrate the changes induced by the evaporation of Owens Lake and subsequent deposition of chemical salts in the lake bed.

|  | Brine before lake evaporated (lunge) | No. 1 type present brine | No. 2 type present brine |
|---|---|---|---|
|  | Gms. per 100 cc. | Gms. per 100 cc. | Gms. per 100 cc. |
| Sodium carbonate | 2.7 | 23.5 | 16.5 |
| Sodium sulfate | 1.1 | 2.5 | 5.3 |
| Sodium chloride (chlorine equiv.) | 3.1 | 19.5 | 21.5 |
| Sodium bicarbonate | 0.4 | 0.95 | 0.4 |
| Ratio carbonate to sulfate | 2.4 to 1 | 9.4 to 1 | 3.1 to 1 |
| Ratio carbonate to bicarbonate | 6.7 to 1 | 24.7 to 1 | 41.2 to 1 |

In the above analyses of brine, sodium chloride represents the total chlorine present in the solution. Actually the present lake brine contains considerable potassium chloride, around 3.0% to 4.5% KCl. For convenience in dealing with the chlorine content of brines, the term sodium chloride as applied to brines will be used throughout this discussion as meaning the total chlorine equivalent.

In the deeper portion of the Owens Lake bed, the deposit of chemical salts is six to nine feet in depth. There is present not only the mother liquor brine but also an excess in solid form of sodium carbonate, sodium bicarbonate, sodium chloride and sodium sulfate, much of which exist as double salts, of which trona and burkeite are representative. Therefore, conditions are favorable for the establishment, at any prevailing temperature, of an equilibrium solution with these solid chemical salts. In other words, there is a very strong tendency for the present lake brine to assume a definite composition for any given temperature. As the brine temperature varies with weather conditions, so the composition of the lake brine changes in its effort to attain equilibrium with its associated chemical salts.

The above analysis of the No. 1 type lake brine is representative of warm brine existing during the summer and fall months of the year. Owens Lake is located in an arid desert region where summer temperatures range up to 120° F. and where winter temperatures range down to 10° F. As winter approaches, the temperature of the warm lake brine decreases. The brine then attempts to adjust its composition to the colder temperature condition. In so doing, large quantities of sodium carbonate dekahydrate, $Na_2CO_3 \cdot 10H_2O$, commonly called crystal soda or sal soda in the trade and literature, are crystallized out of solution and deposited as a solid chemical salt. Therefore, by virtue of cold weather, sodium carbonate content of lake brine is greatly reduced yielding Type 2 brine.

As summer follows winter, the temperature of lake brine increases and sal soda is taken back into solution causing a transition from No. 2 type brine back to No. 1 type brine. As this transitional change is gradual, lake brine of varying composition exists at different seasons of the year depending on the temperature of the lake brine. Because the brine in the lower part of the salt bed is insulated by the overlying portion of solid salts, the lower portion is less sensitive to atmospheric changes in temperature than the upper surface which is directly exposed to weather conditions. Therefore, the bottom brine lags behind the upper brine in temperature changes and hence in transition from one type of brine to another type. Accordingly, the period during which Type 1 brine is available can be extended by selective pumping of brine from the upper or lower part of the chemical salt bed.

Our invention takes advantage of the purification and changes produced by nature in the evaporation of Owens Lake as well as the changes in composition of present lake brine caused by natural changes in local weather temperatures. Today, the chief constituents of Owens Lake brine are sodium carbonate and sodium chloride. Other chemical salts found in this brine are potassium chloride, and sodium bicarbonate, sulfate, borate, phosphate, and silicate as well as some organic matter.

We have found that sodium carbonate can be recovered from complex brines, such as Owens Lake brine as described above, by the following procedure:

A supply of lake brine is pumped from the lake, thereby separating it from the chemical salts found in the lake bed. This brine is then subjected to either natural or artificial cooling, thereby causing the crystallization of sodium carbonate in the form of sodium carbonate dekahydrate ($Na_2CO_3 \cdot 10H_2O$), commonly known in the trade and in the literature as crystal soda or sal soda.

By separating the dekahydrate or sal soda crystals so obtained, from the mother liquor brine we have, in fact, performed a preliminary purification which partially removes impurities, such as sodium chloride, sodium sulfate, borate, phosphate and silicate. The crude sal soda crystals after separation from the mother liquor still contain some of their original impurities but in considerably lesser proportions than in the original brines. We have determined that sodium carbonate can be recovered from these crude sal soda crystals substantially free of these impurities by the following process.

This procedure comprises adding sodium chloride to the crude sal soda crystals before melting. The mixture of sal soda crystals and sodium chloride is then melted and the mixture heated to a temperature over 30° C., thereby causing the precipitation of sodium carbonate monohydrate ($Na_2CO_3 \cdot H_2O$). In this procedure the precipitation of sodium carbonate monohydrate is progressive from the time the mixture is melted and during the heating of the mixture to higher temperatures. When some predetermined temperature above 30° C. is reached the monohydrate crystals are quickly separated from their mother liquor.

We have found that a range of 80° C. to 95° C. is a desirable temperature range in which to carry on the precipitation of sodium carbonate monohydrate. At such temperatures the rate of precipitation is extremely rapid so that the reactions are accomplished in 5 to 7 minutes time. Also the crop of sodium carbonate monohydrate is composed of crystals which are relatively large and uniform in size and the crop is quite free of small mush like crystals. On account of the large uniform size of these crystals we find that they settle very rapidly from the mother liquor.

Furthermore, we find that soda ash produced by calcination of these crystals obtained by this procedure has superior physical characteristics, being quite free of fine particles sometimes called fines or dust. We also find that our soda ash is superior in free-flowing qualities which makes this soda ash easier to handle through chutes, feeders and other handling equipment than soda ash produced by other processes and also on account of the large uniform crystals there is less tendency of the crystals to cake. This superior physical crystal structure of the monohydrate lends itself to easier and quicker calcination to soda ash.

We find that small amounts of organic matter and silica are precipitated with the monohydrate. This precipitated organic matter and silica exist in a very finely divided or flocculent state while the sodium carbonate monohydrate is formed in uniformly large crystals. These monohydrate crystals settle rapidly while the organic matter and silica remain in suspension. Therefore this silica and organic matter can be readily separated by decantation of the mother liquor from the crystals. The separation of silica improves the grade of the monohydrate crystals. Separation of organic matter improves the color of calcined soda ash. Neither silica nor organic matter are desirable constituents of sodium carbonate although they may not be detrimental for many uses.

We find that the sodium carbonate monohydrate crystals ($Na_2CO_3.H_2O$) produced by our process can be easily converted to anhydrous sodium carbonate, (soda ash $Na_2CO_3$) by heating at relatively low temperatures slightly exceeding 100° C., say 110° C. to 120° C. This is a great advantage over other processes employing carbonation on complex brines where bicarbonate and sesqui carbonate of soda or urao are formed as an intermediate product and where much higher temperatures are employed for conversion to soda ash.

When it is desired to obtain the best grade of sodium monohydrate from the melted crude sal soda crystals, we find that the mother liquor adhering to the monohydrate crystals must be carefully and quite thoroughly separated from the crystals. We find that an efficient way to separate mother liquor from the monohydrate crystals is to replace the mother liquor by wash water or by a substantially pure solution of sodium carbonate and then filter or centrifuge the crystals to a low moisture content. If desired additional washing of monohydrate crystals may be done during the filtering or centrifuging operation.

Cooling of the mother liquor will cause the precipitation of sal soda crystals. The crop of sal soda crystals produced in this manner, can be utilized for the production of sodium carbonate monohydrate in the manner set out herein. These crystals being the result of a second crystallization are of a higher degree of purity than those obtained directly from the lake brine, and hence are especially useful in obtaining a superior quality sodium carbonate monohydrate product.

The following is given as a typical example of our process as applied to complex brine. It is understood that our invention is applicable not only to natural complex brines, but also to natural brine whose chemical composition has been artificially altered or to artificial brine made up by solution of solid chemical salts containing sodium carbonate.

The brine used was taken from Owens Lake. It contained:

| | Gms. per 100 cc. lake brine before cooling | Gms. per 100 cc. mother liquor after cooling |
|---|---|---|
| $Na_2CO_3$ | 22.6 | 10.5 |
| $NaCl$ | 16.9 | 24.9 |
| $Na_2SO_4$ | 4.3 | 4.5 |
| $Na_2B_4O_7$ | 1.9 | 3.0 |

2840 pounds of this brine at a temperature of 20° C. were taken out of the lake and placed in a small wooden tank and allowed to cool naturally during six days and nights subject to the prevailing cold weather. The temperature was thus gradually reduced to 7½° C. during which time sal soda crystals were deposited. The mother liquor, whose analysis is shown above, was then separated from the crystals. This crystallization is similar to the crystallization of sal soda crystals which occurs during each winter in the brine in the lake bed and which can be observed in holes made in the surface of the lake or upon the surface of the lake itself wherever brine is exposed to cold weather conditions. An early observation of the use of complex lake brines for producing such sal soda crystals by the natural cooling during the colder periods of the year was made and recorded by Thomas M. Chatard at pages 50 and 51 in Bulletin No. 60 of the U. S. Geological Survey published in 1890.

The crude sal soda crystals thus produced were removed from the mother liquor, the analysis of which is shown above. The crude crystals were further separated from the mother liquor by centrifuging. No washing was applied either before or during the filter operation. The centrifuged sal soda crystals weighed 600 pounds, and their analysis was as follows:

| | Per cent |
|---|---|
| $Na_2CO_3$ | 33.5 |
| $NaCl$ | 1.4 |
| $Na_2SO_4$ | 2.37 |
| $Na_2B_4O_7$ | 0.1 |
| Water | 63.0 |

32.3 pounds of crude sal soda crystals were mixed with 3.16 pounds (about 10%) of sodium chloride and the mixture melted and heated, without evaporation, to 89° C. thereby causing the precipitation of sodium carbonate monohydrate, substantially free of impurities.

To eliminate silica and organic matter, the monohydrate crystals were quickly separated from their mother liquor by settling and decantation, followed by centrifuging. The sodium carbonate monohydrate crystals thus obtained were not washed, either before or during centrifuging, and the unwashed monohydrate analyzed as follows:

| | Per cent |
|---|---|
| $Na_2CO_3$ | 84.0 |
| $NaCl$ | 1.2 |
| $Na_2SO_4$ | 0.55 |

7.1 pounds of sodium carbonate monohydrate crystals were obtained. The yield amounted to 54.7% of the total $Na_2O$ contained in the crude sal soda used.

The mother liquor, separated from the monohydrate crystals, had a temperature of 70° C. after filtration and analyzed as follows:

| | Per cent |
|---|---|
| $Na_2CO_3$ | 22.4 |
| $NaCl$ | 16.7 |
| $Na_2SO_4$ | 2.94 |

This mother liquor is quite similar in sodium carbonate and sodium chloride contents to the lake brine from which the crude sal soda crystals were crystallized. From the standpoint of impurities, it contains less sodium sulfate, borates, phosphates, and silicates than the original lake brine. On cooling this mother liquor to low temperatures, around 0° C. to 18° C., there is obtained another crop of sal soda crystals which can be used for the production of monohydrate crystals as described above or put to other useful purposes.

The sodium carbonate monohydrate crystals from the above precipitation test were calcined at a temperature slightly exceeding 100° C. in order to drive off the water of crystallization contained in the monohydrate. In this way there were produced 6.05 pounds of soda ash which analyzed as follows:

|  | Per cent |
|---|---|
| $Na_2CO_3$ | 97.7 |
| NaCl | 1.4 |
| $Na_2SO_4$ | 0.65 |

The above test was repeated with the added step of washing the monohydrate crystals before and during centrifuging so as to raise the grade of resulting soda ash. There were obtained 5.05 pounds of soda ash which analyzed as follows:

|  | Per cent |
|---|---|
| $Na_2CO_3$ | 98.3 |
| NaCl | 0.95 |
| $Na_2SO_4$ | 0.58 |

The following screen test and densities on resulting soda ash represent the character of ash produced by the above method of precipitating sodium carbonate monohydrate.

|  | From unwashed monohydrate Percent | From washed monohydrate Percent |
|---|---|---|
| On 20 mesh | 1.0 | 0.9 |
| On 30 mesh | 0.4 | 0.5 |
| On 40 mesh | 1.4 | 1.8 |
| On 50 mesh | 18.4 | 13.4 |
| On 60 mesh | 21.4 | 18.9 |
| On 70 mesh | 31.3 | 33.4 |
| On 100 mesh | 12.8 | 14.8 |
| Minus 100 mesh | 13.9 | 15.9 |
| Density, pounds per cubic foot | 53 | 56 |

Washing of the monohydrate crystals before calcination not only increases the sodium carbonate content of the resulting soda ash but also reduces the size of crystals slightly and increases the density of the soda ash.

Attention is called to the density of this product because some processes produce a lighter ash with density of 35 pounds to 42 pounds per cubic foot, in which case further treatment is required to obtain soda ash of sufficient high density for many uses.

The above is a typical example of our process wherein sodium chloride is mixed with the crude sal soda and the mixture melted and heated to cause the precipitation of substantially only sodium carbonate monohydrate.

In order to obtain information and data on the process, to determine the effect of varying temperatures and differing percentages of sodium chloride additions to the crude sal soda, many precipitation tests were conducted and the effect on yields of $Na_2CO_3$, character and purity of monohydrate crystals and soda ash, character and analyses of mother liquors, pounds of crude sal soda required per pound of product obtained, and pounds of sodium chloride used per pound of product obtained, were observed and recorded. For instance, many tests were made on the process, to which additions of sodium chloride were made approximating 2%, 4%, 6%, 8%, 10%, 12%, 14%, and 16% of sodium chloride and the results found satisfactory. Without intending to limit ourselves to the specific temperature, or the specific amount of salt addition, we have given above the results of tests in which 10% sodium chloride was added to the crude sal soda as indicating a desirable operating condition.

In the one figure of the drawing is shown a flow sheet representing a practical manner of recovering sodium carbonate from complex brine by our invention. 1 is the brine supply which may be Owens Lake brine or other source of supply. Pump 2 handles brine from 1 to vat or container 3, where the brine is allowed to cool to temperatures ranging between 0° C. to 18° C. inclusive. This cooling of the brine causes sal soda or "winter soda" crystals to deposit. The maximum temperature at which this crystallization will begin depends to a large extent upon the total sodium carbonate content. With type one brines crystallization may begin at around 18° C. With Type 2 brines, the temperature of the brine when pumped out of the main salt body of Owens Lake may have an initial temperature as low as 12° to 15° C. Therefore, in the case of Type 2 brine crystallization will not begin until the brine has been cooled to a lower temperature than the natural temperature of the brine existing in the lake. As previously explained Type 2 brines have already been subjected to natural cooling and part of the sodium carbonate content deposited in the bed of the lake as sal soda crystals. Once crystallization of sal soda crystals from complex brines has started, the crystallization will continue down to quite low temperatures. The minimum temperature in the case of natural cooling would be determined largely by the prevailing atmospheric temperature as well as the length of time the brine was exposed to such cooling influences. If the cooling were effected by artificial means the choice of minimum temperature would be largely determined by the cost of producing such artificial cooling. We have set a minimum temperature of 0° C. as representing about as low temperature as can easily be obtained by natural cooling, or that would be economical in case of artificial cooling. We have selected a maximum of 18° C. as a practical point at which crystallization would start. Desirable operating limits would therefore range from this maximum temperature down to between 5° C. and 12° C. Large crops of sal soda or "winter soda" crystals could be obtained between these limits at reasonable cost, and such temperature may be obtained by natural cooling induced by weather conditions.

Crude sal soda crystals from 3 are separated from the mother liquor by filtration apparatus 4. This separation of sal soda crystals from mother liquor may be obtained by draining in vats, or the crystals may be separated by centrifuging or by use of other mechanical dewatering devices.

The crude sal soda crystals from 4 are mixed with sodium chloride in a mixer 5.

The mixture of crude sal soda crystals and sodium chloride is then placed in the heater 6, and heated to a temperature in excess of 30° C. which causes the melting of the sal soda crystals in their water of crystallization, followed by solution of the sodium chloride which causes the precipitation of sodium carbonate monohydrate. We have found that a mixture of sodium chloride and sal soda crystals will melt at a lower temperature than absolutely pure sal soda crystals, and that the melting often takes place in the neighborhood of 28° C. We have found that the precipitation of sodium carbonate monohydrate will go forward to completion at the temperature of about 31° C. but that considerable length of time is necessary for the completion of the necessary reactions at such a low temperature. We have found that the speed of precipitation increases with rising temperatures and that the precipitation may be conducted at temperatures ranging up to the boiling point of the mixture. At such high temperatures there is a tendency for the mixture to give off water vapor which is more or less of a nuisance and can be avoided by operating at slightly lower temperatures. We have found that a desirable temperature range for heating is from 80° C. to 95° C. since within this range the precipitation is rapid and the yield and character of the sodium carbonate monohydrate crystals are satisfactory.

The precipitated sodium carbonate monohydrate crystals from 6 are quickly separated from their mother liquor in classifier 7. This operation can be conducted by any suitable equipment and the well known Akins or Dorr classifiers are well adapted for this work. The finely divided organic matter or silica in suspension in the mother liquor may be decanted from the crystals in classifier 7, so that this separation is to some extent a purification step in the process.

Partially drained crystals are discharged from classifier 7 and may be passed through classifier 8 where they may be treated with wash water for the removal of adhering mother liquor with the object of additional separation of impurities from the crystals.

Crystals discharged from classifier 8 may be separated from adhering wash brine by filtration apparatus 9, and for this purpose we prefer to use a centrifuge, although the separation may be performed by other types of filtering apparatus.

Crystals discharged from apparatus 9 may be heated in a calciner 10 in order to drive off the water of crystallization contained in the sodium carbonate monohydrate crystals and thus convert these crystals into the anhydrous sodium carbonate, known commercially as soda ash. In the calciner the monohydrate crystals are heated to a temperature exceeding 100° C. We have found that this calcination proceeds rapidly around 110° C. or 120° C.

The mother liquor from crystallization Step 3 may be discarded as this mother liquor contains certain of the impurities found in the complex brine from which the sal soda crystals were obtained.

The mother liquor from classifier 7 may be subjected to cooling in sal soda crystallizer 11 where another crop of sal soda crystals may be produced at temperatures ranging between 0° C. and 18° C. Such sal soda crystals may be returned to the process at filtration apparatus 4 or may be put to other uses.

While we have described an invention with an illustration and with a flow sheet, it is to be understood that modifications may be made without departing from the intent and purposes of this invention.

We claim:

1. A process of separating and recovering sodium carbonate in a purified state from complex brines containing sodium carbonate and other substances which comprises cooling said brines within the temperature range of 0° C. to 18° C. thereby causing the crystallization of crude sal soda, separating said crude sal soda crystals from their mother liquor, mixing said sal soda crystals with solid sodium chloride, heating said mixture of crystals in the water of crystallization alone to temperatures between 80° and 95° C. to precipitate sodium carbonate monohydrate.

2. A process of separating and recovering sodium carbonate in a purified state from complex brines containing sodium carbonate and other substances which comprises cooling said brines within the temperature range of 0° C. to 18° C. thereby causing the crystallization of crude sal soda, separating said crude sal soda crystals from the mother liquor, mixing said sal soda crystals with solid sodium chloride, heating said mixture of crystals in the water of crystallization alone from five to seven minutes at temperatures in excess of 80° C. to precipitate sodium carbonate monohydrate, quickly separating the monohydrate mother liquor from said precipitate, washing said crystals with wash water to further separate adhering monohydrate mother liquor from crystals, filtering said washed crystals, and calcining said crystals at temperatures sufficiently high to produce soda ash.

3. A process of separating sodium carbonate in a purified state from complex brines containing sodium carbonate, sodium sulphate and small amounts of silica and other impurities not desired in the recovered sodium carbonate which comprises cooling said brines within the temperature range of 0° C. to 18° C. thereby causing the crystallization of crude sal soda, separating the precipitated crude sal soda crystals from the mother liquor, mixing the sal soda crystals with solid sodium chloride, heating the mixture of sal soda crystals and sodium chloride in the water of crystallization alone to temperatures in excess of 80° C. to precipitate sodium carbonate monohydrate, quickly separating the monohydrate mother liquor from said precipitate, cooling said mother liquor within the temperature range of 0° C. to 18° C. thereby causing the crystallization of crude sal soda crystals from said mother liquor, separating and returning said sal soda crystals to the process for the further production of sodium carbonate monohydrate.

4. In the process of producing a dense soda ash, the step of mixing sal soda crystals with solid sodium chloride, heating said mixture of crystals in the water of crystallization alone to temperatures ranging from 80° to 95° C. and quickly separating the mother liquor therefrom after said temperatures have been maintained for between 7 to 5 minutes to precipitate sodium carbonate monohydrate.

5. In the process of separating and recovering sodium carbonate in a purified state from complex brines containing other substances in addition to sodium carbonate, the step of mixing solid sodium chloride with sal soda crystals containing less than 3½% sodium sulfate, heating said mixture of sodium chloride and sal soda crystals in the water of crystallization alone to temperatures ranging from 80° to 95° C. and quickly separating the mother liquor therefrom after said temperatures have been maintained for between 7 to 5 minutes to obtain sodium carbonate monohydrate within said temperature range substantially free of impurities.

6. In the process of separating and recovering sodium carbonate in a purified state from complex brines containing other compounds in addition thereto, the steps of mixing solid sodium chloride with sal soda crystals containing less than 3½% sodium sulfate, heating said mixture of sodium chloride and sal soda crystals in the water of crystallization alone to temperatures in excess of 30° C. and less than 95° C. to precipitate sodium carbonate monohydrate within said temperature range and quickly separating the mother liquor containing finely divided organic matter and silica from the sodium carbonate monohydrate crystals.

7. The method hereinbefore described of securing large sized sodium carbonate monohydrate crystals from untreated Owens Lake brines which method consists in cooling said brines within the temperature range of 0° to 18° C., thereby causing the crystallization of crude sal soda crystals, separating said crude sal soda crystals from their mother liquor, mixing 5 to 15% by weight of solid sodium chloride with said crude crystals, quickly melting and heating said mixture in the water of crystallization alone to a temperature between 80° and 95° C. for 5 to 7 minutes, precipitating sodium carbonate monohydrate crystals, and then quickly decanting the mother liquor, thereby removing with the mother liquor the bulk of the impurities originally contained in said crude sal soda precipitate.

8. A method of separating substantially pure sodium carbonate of a density of 35 to 42 pounds per cubic foot from associated material which includes precipitating from the associated material sodium carbonate dekahydrate by means of cooling, adding solid sodium chloride, heating the mixture of crystals in the water of crystallization alone to effect a melting of the crystals and precipitation of sodium carbonate monohydrate and quickly separating the mother liquor from said monohydrate crystals.

9. The method of separating sodium carbonate of a relatively high density from associated material which includes precipitating from the associated material sodium carbonate dekahydrate in crystalline form by means of cooling, adding approximately 10 per cent by weight of solid sodium chloride, heating the mixture of crystals in the water of crystallization alone to temperatures ranging from 80° to 95° C. to effect a melting of the crystals and precipitation of sodium carbonate monohydrate and quickly separating the mother liquor from said monohydrate crystals.

10. The method of obtaining an anhydrous sodium carbonate from associated material which includes precipitating from the associated material sodium carbonate dekahydrate by means of cooling, adding 10 per cent by weight of solid sodium chloride to the crystals, heating the mixture in the water of crystallization alone to temperatures ranging between 80° to 95° C. to effect a melting and precipitation of sodium carbonate monohydrate crystals, quickly separating the mother liquor, and heating the resultant crystals at relatively low temperatures ranging from 110° to 120° C.

GLENN A. KEEP.
ERIC EDWARD TODD.